A. GONELLA & S. SACERDOTE.
STEAM COOKING APPARATUS FOR FOOD.
APPLICATION FILED DEC. 27, 1911.
1,087,114.
Patented Feb. 17, 1914.
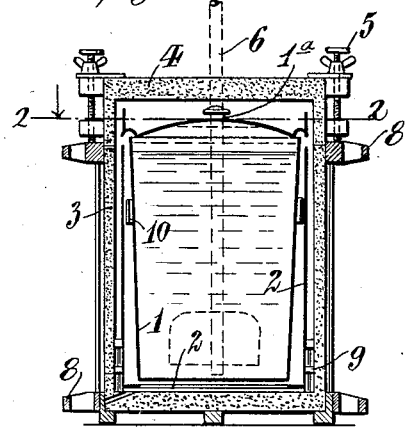
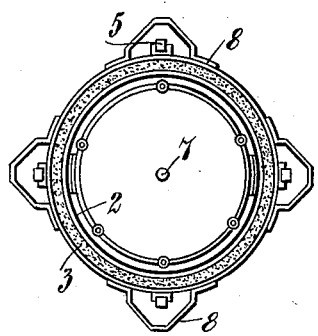
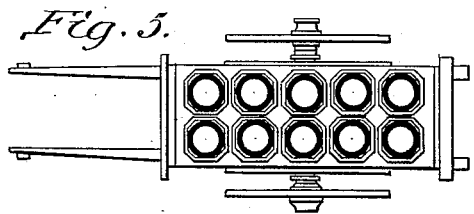
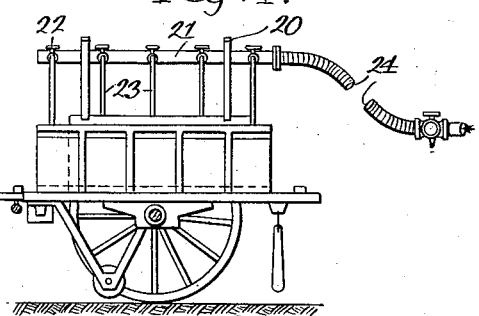
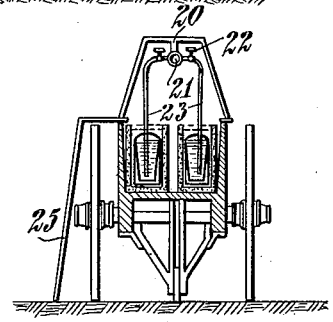
WITNESSES
INVENTORS:
Angelo Gonella
Secondo Sacerdote
BY
ATTORNEY

UNITED STATES PATENT OFFICE.

ANGELO GONELLA AND SECONDO SACERDOTE, OF MILAN, ITALY.

STEAM-COOKING APPARATUS FOR FOOD.

1,087,114. Specification of Letters Patent. Patented Feb. 17, 1914.

Original application filed December 6, 1910, Serial No. 595,865. Divided and this application filed December 27, 1911. Serial No. 668,179.

*To all whom it may concern:*

Be it known that we, ANGELO GONELLA, a captain of the Royal Italian Army, and SECONDO SACERDOTE, civil engineer, both subjects of the King of Italy, and residents of 24 Via Solferino, Milan, Italy, have invented a Steam-Cooking Apparatus for Food, of which the following is a specification.

The invention relates to the cooking of food by steam in heat retaining vessels, such as described in our application for patent, Ser. No. 595,865, filed on December 6th, 1910, of which this is a division.

The object of our present invention is to provide a steam cooking heat retaining vessel adapted to be carried with a number of similar vessels in close juxta-position on a wagon in such manner that steam can be simultaneously injected into all the vessels to start the cooking of the food contained therein. After the steam has subsequently been shut off and the vessels have been closed, the wagon carrying the vessels can be moved to any desired point, the food in the vessels in the meanwhile being cooked ready to be served at any time.

A further object of our invention is to provide an individual cooking vessel of this kind, preferably made of cylindrical shape, but equipped with cornered handles at the top and bottom, so that a number of vessels can be placed very close together on a wagon whereby they will be prevented from shifting and knocking against each other, while the wagon is *en route*.

In the drawing, Figure 1 is a central vertical section through a cooking vessel according to our invention, Fig. 2 a cross-section, the plane of section being taken below the cover of the cooking vessel, as indicated by the broken line 2—2 in Fig. 1. Fig. 3 an end-view, partly in section, of a wagon carrying a plurality of vessels, showing also the removable steam supply, Fig. 4 a side view of the same, and Fig. 5 a top view, the steam supply being omitted.

1 is the inner cooking vessel adapted to receive the food to be cooked, 2 a removable fire grate and 3 the outer heat retaining vessel with the lid 4, which can be screwed down by thumb screws which are placed on screw bolts 5 hinged to the sides of the outer vessel 3.

6 is the steam pipe adapted to be introduced into the inner vessel 1 when the lid 4 is removed. This steam pipe passes through an opening 7 in the removable cover of the inner vessel 1 and is shown in dotted lines. When pipe 6 is withdrawn, the hole 7 in the cover of the vessel can be closed by a plug 1ª.

The outer vessel which is preferably made of cylindrical shape is provided at the top and bottom with rigid handles 8 formed in such a way as to make the outer vessel approximately square in contour so that, as shown in Figs. 3 to 5 a number of such vessels can be very closely placed together on a wagon, whereby the vessels are prevented from shifting and knocking against each other.

20 is a removable frame adapted to be mounted on the wagon and carrying the steam pipe 21, to which are connected the branch pipes 23.

22 are shut off valves or cocks, while 24 is a flexible connection between the pipe 21 and a suitable steam supply (not shown).

The operation is as follows:—The inner vessels 1 which contain the food to be cooked are placed into the heat retaining outer vessels 3 and these are placed then on the wagon, as shown, without their lids. The frame 20 carrying the steam pipe 21 and the branches 23 is then mounted on the wagon in such a way that the latter are introduced into the inner vessels 1 to admit steam to them until the water in said vessels is brought to the boiling point. Then the steam is shut off by the closing of the cocks 22, and after the frame 20 has been removed the lids 4 are screwed down on all the vessels. The wagon can now be moved to any desired point while the food in the vessels 1 keeps slowly boiling so that when the vessels on their arrival at the destination are opened, the food is ready to be served.

We claim as our invention:—

1. A steam cooking apparatus comprising a plurality of cooking vessels adapted to be arranged in close juxta-position, a steam pipe, branch pipes connected thereto one for each vessel, means for controlling the amount of steam passing into the vessels, an outer heat retaining vessel for each cooking vessel, and a removable connection for connecting the said steam pipe with a steam supply.

2. A steam cooking apparatus comprising a plurality of cooking vessels adapted to be arranged in close juxta-position, a steam pipe, branch pipes connected thereto one for each vessel, a removable frame adapted to support the said steam pipes with said branches over said vessels, means for controlling the amount of steam passing into the said vessels, an outer heat retaining vessel for each cooking vessel, and a flexible connection for the said steam pipe.

3. In a steam cooking apparatus of the kind described an inner vessel adapted to receive the food to be cooked, an outer heat retaining vessel adapted to receive said inner vessel and preferably made of cylindrical shape and provided at the top and bottom with rigid cornered handles giving the said outer vessel practically a square contour and permitting a plurality of such vessels to be placed in close juxta-position.

In testimony whereof we have affixed our signatures in presence of two witnesses.

ANGELO GONELLA.
SECONDO SACERDOTE.

Witnesses:
CHARLES C. BRAY,
P. DE FRANCIS.

Copies of this patent may be obtained for five cents each, by addressing the "Commissioner of Patents, Washington, D. C."